US008579346B2

(12) United States Patent
Schaefer et al.

(10) Patent No.: US 8,579,346 B2
(45) Date of Patent: Nov. 12, 2013

(54) MOTOR VEHICLE HANDLE

(75) Inventors: Thilo Schaefer, Gross Gerau (DE);
Johann Kleeb, Griesheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 310 days.

(21) Appl. No.: 13/028,759

(22) Filed: Feb. 16, 2011

(65) Prior Publication Data
US 2011/0197393 A1 Aug. 18, 2011

(30) Foreign Application Priority Data

Feb. 17, 2010 (DE) .................. 10 2010 008 256

(51) Int. Cl.
*B60R 13/04* (2006.01)

(52) U.S. Cl.
USPC ........................................ 296/1.08; 296/37.1

(58) Field of Classification Search
USPC .............. 296/1.02, 37.14, 71, 37.1; 16/110.1; 24/289
See application file for complete search history.

(56) References Cited

U.S. PATENT DOCUMENTS

| 5,662,375 A | 9/1997 | Adams et al. |
| 6,415,478 B1 | 7/2002 | Watanabe et al. |
| 7,415,751 B2 | 8/2008 | Kato et al. |
| 2003/0234549 A1 | 12/2003 | Totani et al. |
| 2008/0240851 A1 | 10/2008 | Spitz |

FOREIGN PATENT DOCUMENTS

| DE | 7813898 U1 | 8/1978 |
| DE | 3346243 A1 | 7/1985 |
| DE | 9201258 U1 | 3/1992 |
| DE | 19611724 A1 | 10/1997 |
| DE | 10055647 A1 | 6/2001 |
| DE | 10218838 C1 | 9/2003 |
| EP | 1943426 A1 | 7/2008 |
| WO | 9617178 A1 | 6/1996 |

OTHER PUBLICATIONS

German Search Report dated Sep. 10, 2010, issued in Application No. 10 2010 008 256.2.

*Primary Examiner* — Glenn Dayoan
*Assistant Examiner* — Pinel Romain
(74) *Attorney, Agent, or Firm* — Ingrassia Fisher & Lorenz, P.C.

(57) ABSTRACT

A handle, preferably for a motor vehicle, includes, but is not limited to a frame surrounding an upper part. At least one engagement hook is arranged on the frame, which can be hooked into at least one corresponding counterpart provided on the upper part, and with a lower part that can be arranged on the upper part, on which lower part at least one projection that can be placed against the engagement hook is provided.

12 Claims, 2 Drawing Sheets

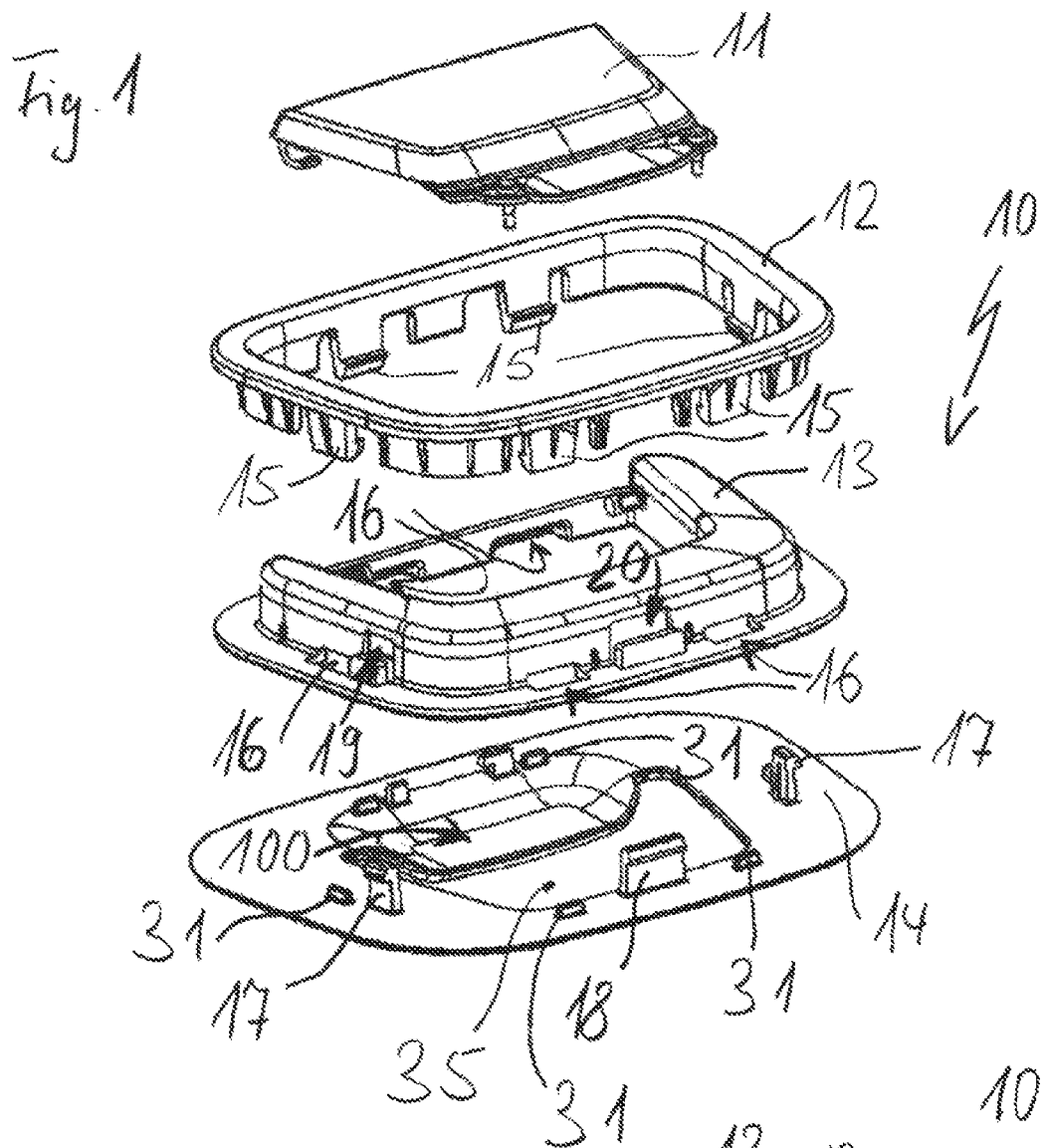
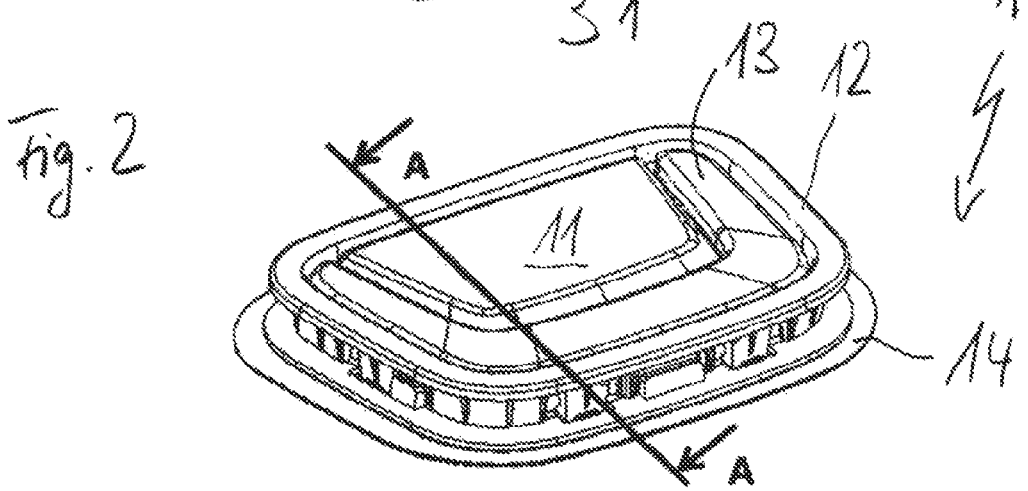

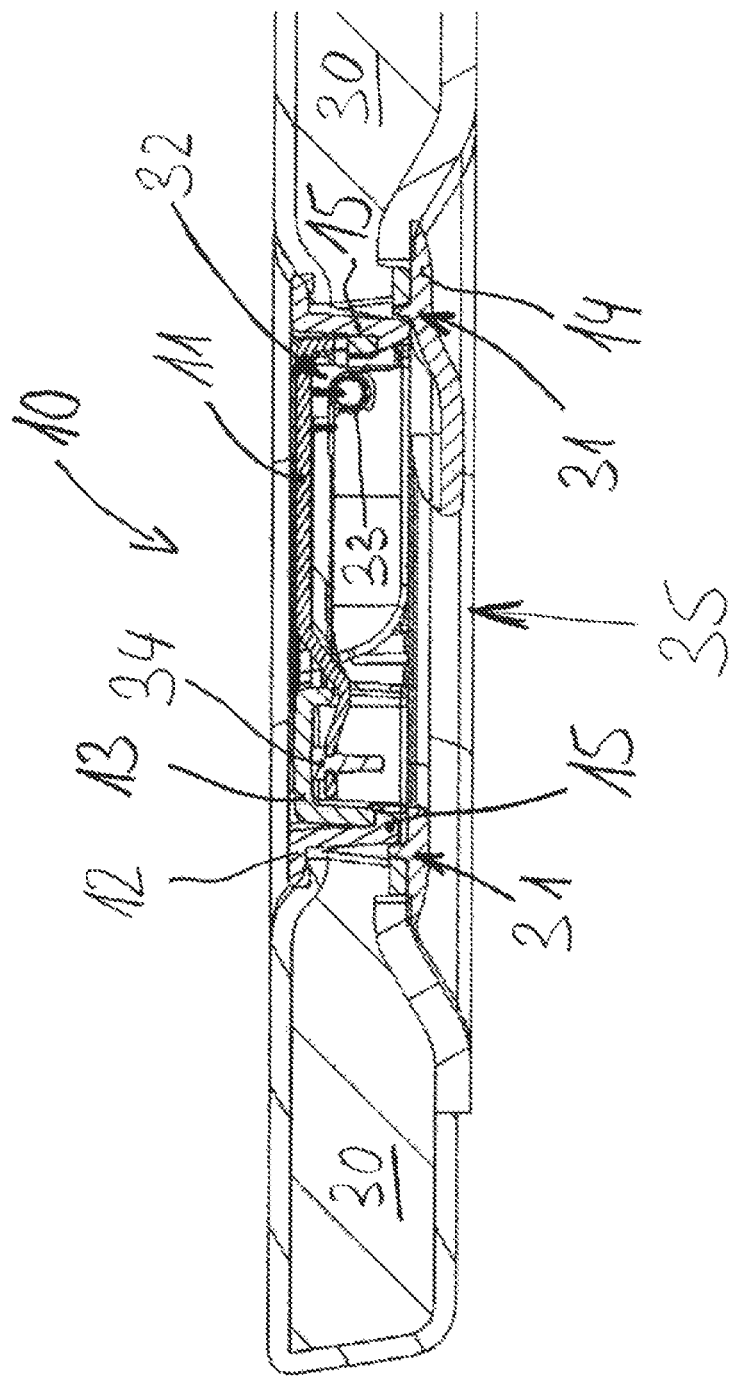

MOTOR VEHICLE HANDLE

CROSS-REFERENCE TO RELATED APPLICATION

This application claims priority to German Patent Application No. 102010008256.2, filed Feb. 17, 2010, which is incorporated herein by reference in its entirety.

TECHNICAL FIELD

The technical field relates to a handle, and more particularly to a handle for a motor vehicle.

BACKGROUND

A handle, particularly for a motor vehicle, is provided with a frame surrounding an upper part. At least one engagement hook is arranged on the frame, which can be engaged in at least one opening and/or on at least one projection of the upper part.

The handle can, for example, be provided in a trunk floor of a combination vehicle in order to lift the floor. With a force approximately acting in a concentrated manner, for example, by one person kneeling in the trunk and in the process pressing on the handle with his/her knee it can happen that the engagement hook is inadvertently released from its engagement and the handle thus more or less falls apart.

DE 78 13 898 U1 describes a device with which two components, particularly an armrest, can be connected to a side wall part of a motor vehicle by means of an engagement connection. For this purpose, an engagement hook is secured by means of a bolt to be arranged transversely to said engagement hook. However, this safeguard cannot be applied to the handle mentioned at the outset for solving the above-mentioned problem.

In view of the foregoing, it is at least one object to improve the handle mentioned at the outset so that the engagement hook always remains reliably engaged. In addition, other objects, desirable features and characteristics will become apparent from the subsequent summary and detailed description, and the appended claims, taken in conjunction with the accompanying drawings and this background.

SUMMARY

A handle, particularly for a motor vehicle, is provided with a frame surrounding an upper part. At least one engagement hook is arranged on the frame, which can be hooked into at least one corresponding counterpart provided on the upper part, and with a lower part to be arranged on the upper part, on which at least one projection that can be placed against the engagement hook is provided. Through the projection placed against the engagement hook the engagement hook can no longer be pushed out of its engaged position so that it remains reliably engaged even when a major force acts on the handle. A function of the projection is at a maximum when it is abuts the free end of the engagement hook as closely as possible. In one embodiment the at least one projection can be embodied as a web.

The lower part can be fastened to the upper part with at least one engagement hook. In this manner, additional fastening means such as for example screws and the like can be omitted, as a result of which the assembly can be performed more easily and more quickly. The handle can be integrated in a break-through of a trunk floor of a combination vehicle. Thus the trunk floor can be folded over with the handle in order to get to a concealed stowage space. The trunk floor can be designed as a plate-shaped object or as a mat. On the lower part a handle element can be arranged. With the handle element the folded-over trunk floor can be folded back again.

The handle element can be realized particularly easily if it is designed as a break-through provided in the lower part. However, in an alternative configuration the handle element can also be designed eye-shaped or hook-shaped. The break-through can be adjoined by a depression that can be reached into by the tips of the fingers in order to be able to better fold back the folded-over trunk floor.

On the upper part, a lid, for example with a pin-shaped hinge, can be articulated. The lid closes an interior space of the handle. The lid can be at least approximately flush with the surface of the trunk floor. Because of this, an attractive design is achieved so that the handle is hardly noticed especially if it has a same or similar color as the trunk floor. Through the articulation the lid can be pivoted in the direction of the lower part if one wishes to use the handle in order to fold over the trunk floor. For this purpose one simply presses against the lid with the finger tips and subsequently reaches behind the upper part in order to pull it. The lid can be pushed against the upper part with a spring element so that it closes the interior space of the handle when the handle is not operated.

In a region located opposite its articulation the lid can have a buffer element which prevents that the lid strikes against the upper part. In this manner, interfering rattling noises can be avoided. The at least one counterpart provided on the upper part can comprise an opening and/or a projection into which the engagement hook can be reliably hooked.

A motor vehicle is also provided having a handle as previously and subsequently described.

BRIEF DESCRIPTION OF THE DRAWINGS

The present invention will hereinafter be described in conjunction with the following drawing figures, wherein like numerals denote like elements, and;

FIG. 1 is a perspective exploded representation of the handle.

FIG. 2 a perspective top view of the handle from FIG. 1. and

FIG. 3 a sectional view through the handle from FIG. 2.

DETAILED DESCRIPTION

The following detailed description is merely exemplary in nature and is not intended to limit application and uses. Furthermore, there is no intention to be bound by any theory presented in the preceding background or summary or the following detailed description.

FIG. 1 and FIG. 2 show a handle 10 with a lid 11, a frame 12, an upper part 13 and a lower part 14. For assembly, the lid 11 is inserted in the upper part 13 from the top. This unit preassembled so far is inserted from the bottom in a break-through which is not shown in more detail of a trunk floor which is likewise not shown. After this, the frame 12 is placed on the upper part 13 from the top and engaged in said upper part. The engagement is ensured by engagement hooks 15 which engage in openings 16 provided for this purpose. Finally, the lower part 14 is pressed against the upper part 13 from below. By means of engagement hooks 17 and 18 which engage in openings 19 and 20 the upper part 13 and the lower part 14 are fastened to each other.

FIG. 3 shows the finish-assembled handle 10 which is integrated in the trunk floor 30. Projections 31 abut the engagement hooks 15. When a force acts on the handle 10 from above said force pushes the handle 10 downwards so that the engagement hooks 15 would be bent to the outside if the projections 31 were not present. Consequently the projections 31 ensure that the engagement hooks 15 remain engaged in the upper part 13 when the force acts on the handle 10 from above.

The lid 11 is articulated on the upper part 13 with an articulation 32 that can be a pin. A spring element 33 presses the lid 11 against the upper part 13. A buffer element 34 is arranged between the lid 11 and the upper part 13 in order to avoid rattling noises.

With the handle 10 the trunk floor 30 can be folded over upwards. For this purpose, one presses the lid 11 down with the tips of the fingers so that said lid is pivoted to the right. After this, one can reach behind the upper part 13, pulling it upwards.

In the lower part 14 a handle element 35 designed as break-through is provided (see also FIG. 1). If one wishes to fold the trunk floor 30 back again, one simply reaches into the break-through and pulls the trunk floor 30 back again. In order to improve the handling when pulling back a depression 100 (see FIG. 1) into which one can reach with the finger tips adjoins the break-through 35.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle handle, comprising:
   an upper part having a raised portion defined about a portion of a periphery of the upper part and an upper part opening defined adjacent to the raised portion;
   a counterpart on the upper part defined opposite a portion of the raised portion such that the upper part opening is between the counterpart and the portion of the raised portion;
   a frame surrounding the periphery of the upper part;
   an engagement hook on the frame that hooks into the counterpart to immovably couple the frame to the upper part; and
   a lower part coupled to the upper part having a projection that is placed against the engagement hook.

2. The motor vehicle handle according to claim 1, wherein the projection is a web.

3. The motor vehicle handle according to claim 1, wherein the lower part is configured to fastened to the upper part with a second engagement hook.

4. The motor vehicle handle according to claim 1, further comprising a handle element arranged on the lower part.

5. The motor vehicle handle according to claim 4, wherein the handle element is embodied as a break-through provided in the lower part.

6. The motor vehicle handle according to claim 5, further comprising a depression adjoining the break-through.

7. The motor vehicle handle according to claim 1, wherein the motor vehicle handle is integrated in a break-through of a trunk floor.

8. The motor vehicle handle according to claim 1, further comprising a lid articulated on the upper part so that the lid substantially covers the upper part opening.

9. The motor vehicle handle according to claim 8, wherein the lid is configured to pivot in a direction of the lower part.

10. The motor vehicle handle according to claim 8, further comprising a spring element configure to push the lid against the upper part.

11. The motor vehicle handle according to claim 8, further comprising a buffer element and the lid is located in a region located opposite an articulation of the lid.

12. The motor vehicle handle according to claim 1, further comprising a second projection on the upper part.

* * * * *